United States Patent
Maucher

[11] Patent Number: 5,667,048
[45] Date of Patent: Sep. 16, 1997

[54] CLUTCH DISENGAGING DEVICE

[75] Inventor: Edmund Maucher, Wooster, Ohio

[73] Assignee: LUK Lamell und Kupplungsbau, Bühl, Germany

[21] Appl. No.: 443,705

[22] Filed: May 18, 1995

[30] Foreign Application Priority Data

May 21, 1994 [DE] Germany .......................... 44 18 002.0

[51] Int. Cl.⁶ .......................... F16D 13/38; F16D 13/75; F16D 23/14
[52] U.S. Cl. .......................... 192/70.25; 192/89.21; 192/98; 192/111 A
[58] Field of Search .......................... 192/70.23, 89.21, 192/93 R, 98, 101, 70.25, 111 A

[56] References Cited

U.S. PATENT DOCUMENTS

| | | | |
|---|---|---|---|
| 2,055,258 | 9/1936 | McNeil | 192/93 R X |
| 2,253,284 | 8/1941 | Bertrand | 192/89.21 X |

FOREIGN PATENT DOCUMENTS

| | | | |
|---|---|---|---|
| 2 658 763 | 8/1991 | France . | |
| 42 39 289 A 1 | 5/1993 | Germany . | |
| 42 39 291 A 1 | 5/1993 | Germany . | |
| 52-31256 | 3/1977 | Japan | 192/93 R |

*Primary Examiner*—Richard M. Lorence
*Attorney, Agent, or Firm*—Darby & Darby

[57] ABSTRACT

A friction clutch having a tiltable clutch spring can be disengaged by tilting the spring with a bearing which can be moved axially to engage the tips of radially inwardly extending prongs of the spring. The bearing is movable axially by an actuator which, in turn, is movable axially and away from a support by a system of ramps and rolling elements. The ramps or the rolling elements are caused to move radially of the axis of the bearing in order to move the rolling elements or the ramps axially in a direction to cause a tilting of the spring and hence a disengagement of the clutch.

39 Claims, 3 Drawing Sheets

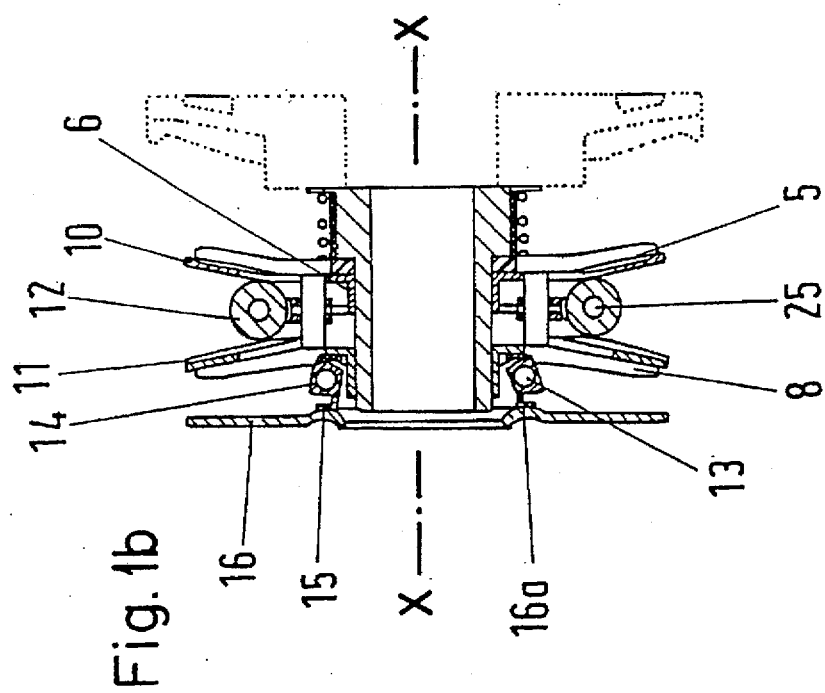
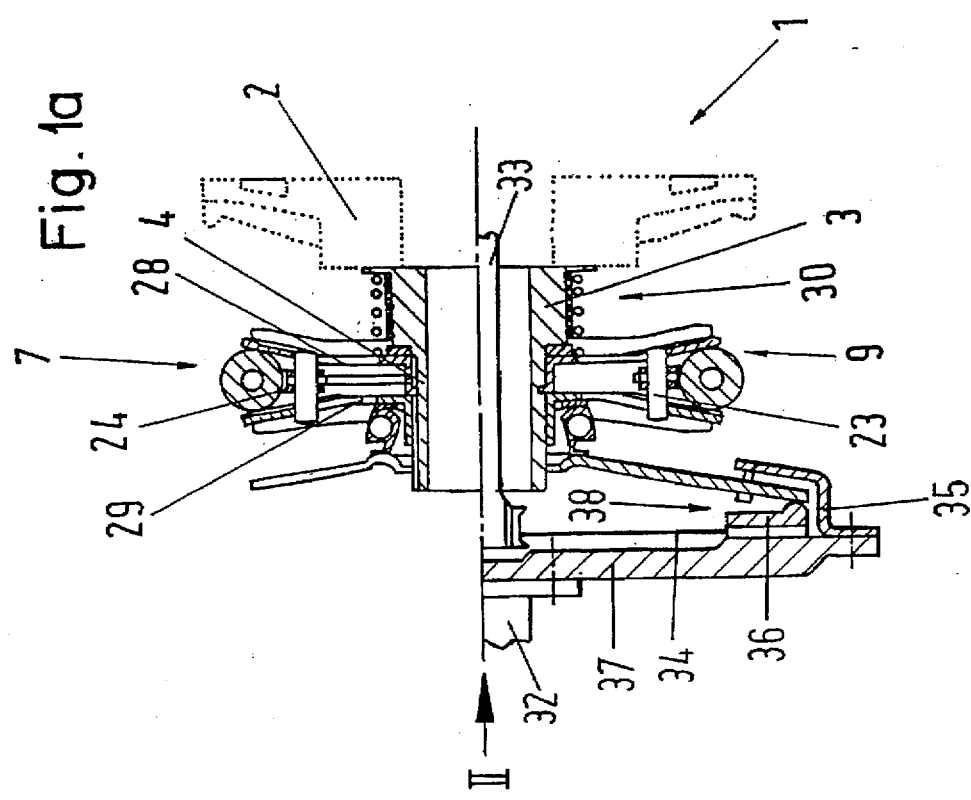

5,667,048

CLUTCH DISENGAGING DEVICE

BACKGROUND OF THE INVENTION

The invention relates to improvements in clutches in general, and more particularly to improvements in devices or apparatus for actuating or operating (i.e., engaging and disengaging) clutches. Still more particularly, the invention relates to improvements in apparatus for engaging and/or disengaging clutches, such as friction clutches, which can be installed between a prime mover (e.g., a combustion engine) and a drive unit, such as a transmission in the power train between the engine and one or more wheels of a motor vehicle.

A clutch actuating or operating apparatus of the character to which the present invention pertains is disclosed, for example, in published French patent application No. A 2 658 763. The apparatus which is disclosed in this publication is rather complex, bulky and expensive. Furthermore, the apparatus employs a relatively large number of parts which contributes to the cost of installation in a motor vehicle or elsewhere and renders it necessary to maintain a large supply of spare parts.

OBJECTS OF THE INVENTION

An object of the invention is to provide a novel and improved apparatus which can be utilized to engage and disengage clutches, such as friction clutches in the power trains between the prime movers and the wheels of motor vehicles.

Another object of the invention is to provide a simple, compact and inexpensive apparatus which can be utilized to actuate (i.e., to change the condition of) presently known clutches.

A further object of the invention is to provide an apparatus which can operate properly irrespective of the extent of wear upon its parts and/or upon the clutch.

An additional object of the invention is to provide a novel combination of a friction clutch and a clutch disengaging apparatus.

Still another object of the invention is to provide a novel combination of motion imparting parts for use in the above outlined apparatus.

A further object of the invention is to provide the above outlined apparatus with novel and improved means for moving one or more driven parts in a first direction in response to movement of one or more driving parts in a different second direction.

Another object of the invention is to provide a novel and improved method of engaging and/or disengaging a friction clutch.

An additional object of the invention is to provide a novel and improved power train for use between the engines and wheels and/or other driven parts in motor vehicles.

Still another object of the invention is to provide a motor vehicle which employs the above outlined apparatus.

SUMMARY OF THE INVENTION

The invention is embodied in an apparatus for changing the condition of an engageable and disengageable clutch having at least one mobile component which is to be displaced between first and second positions to thus change the condition of the clutch. The improved apparatus includes a carrier (e.g., a tubular holder which is affixed to the case of a variable-speed transmission in the power train between the engine and one or more wheels of a motor vehicle), a bearing (such as an antifriction bearing) which is supported by and is movable relative to the carrier longitudinally of a predetermined axis to thereby displace the at least one component between the first and second positions, a support on the carrier, a mobile actuator provided on the carrier between the support and the bearing, and means for displacing the actuator relative to the support. The displacing means includes at least one motion transmitting member which is movable substantially or exactly radially of the predetermined axis to thereby displace the actuator at least substantially in the general direction of the predetermined axis. The clutch can constitute a friction clutch interposed between a rotary output element (such as a crankshaft or a camshaft) of a prime mover (such as the aforementioned engine of a motor vehicle) and an input element (e.g., shaft) of the transmission. The carrier is adjacent the transmission and the bearing is movable with the actuator in the direction of the predetermined axis from the transmission toward the prime mover or in the opposite direction.

The displacing means can comprise ramps and rolling elements which contact the ramps. The ramps can include at least one first ramp on the support and at least one second ramp on the actuator. The rolling elements of such displacing means can include at least one first rolling element which engages the at least one first ramp and at least one second rolling element which engages the at least one second ramp. The arrangement can be such that the ramps are movable substantially radially of the predetermined axis, i.e., the ramps then constitute or include the at least one motion transmitting member. Alternatively, the rolling elements can be mounted for movement radially of the predetermined axis so that such rolling elements include or constitute the at least one motion transmitting member. The ramps can be disposed between the rolling elements or the rolling elements can be disposed between the ramps (as seen in the direction of the predetermined axis). The ramps can comprise first and second sets of ramps which are disposed diametrically opposite each other with reference to the predetermined axis. Alternatively, the rolling elements can comprise two sets which are disposed substantially diametrically opposite each other with reference to the predetermined axis.

The displacing means can further comprise a bowden wire to move the motion transmitting member or members radially or substantially radially of the predetermined axis. Such displacing means can further comprise a linkage which is installed between the axially movable cable of the bowden wire and the motion transmitting member or members, In accordance with a presently preferred embodiment, the displacing means can comprise at least two motion transmitting members and means for moving the at least two motion transmitting members at least substantially simultaneously and at least substantially symmetrically with reference to the predetermined axis.

In a presently preferred embodiment of the apparatus the displacing means comprises the at least one motion transmitting member and at least one ramp on each of the support and the actuator of the improved apparatus. The ramps are spaced apart from each other in the direction of the predetermined axis and the at least one motion transmitting member can comprise a plurality of rolling elements which are rotatable about a second axis extending at least substantially tangentially of the predetermined axis. The rolling elements can include at least one first rolling element in rolling contact with the at least one ramp on the support and at least one second rolling element in rolling contact with the at least one ramp on the actuator. The at least one motion transmitting member can include three rolling elements two of which are in rolling contact with one of the ramps and the third of which is in rolling contact with the other ramp. The third rolling element can be disposed between the two rolling elements, as seen in the direction of the second axis (such second axis is preferably disposed in a plane which is at least substantially normal to the predetermined axis). The third rolling element can have a greater first length and at least one of the other two rolling elements can have a lesser second length, as seen in the direction of the second axis.

The displacing means can be defined as comprising a first part having at least one ramp and a second part including at least one rolling element in contact with or adapted to contact the at least one ramp. One of these parts includes or constitutes the at least one motion transmitting member. The at least one ramp can have an inclined surface making a fixed angle with a plane which is normal to the predetermined axis. Alternatively, such angle can vary as seen in a direction radially of the predetermined axis.

If the displacing means comprises a first ramp on the support and a second ramp provided on the actuator and confronting the first ramp, the actuator is movable in the directions of the predetermined axis and is preferably held against rotation relative to the support about the predetermined axis. The at least one motion transmitting member then comprises at least one rolling element which is disposed between the first and second ramps. As already mentioned hereinbefore, the ramp or ramps can make a fixed angle with a plane which is normal to the predetermined axis; each such ramp can be provided with a slot extending substantially radially of the predetermined axis and the at least one rolling element between the ramps can share movements radially of the predetermined axis with a substantially shaft-like device (e.g., a pivot member for the at least one element) which has portions (e.g., end portions) extending into and being guided by the slots. The displacing means further comprises means for moving the shaft-like device substantially radially of the predetermined axis, and such moving means can include (for example) the aforementioned bowden wire as well as a holder for the at least one rolling element. The holder can resemble or constitute a yoke and can be mounted on the aforementioned shaft-like device. The means for transmitting motion between the bowden wire and the holder can include a suitable linkage which is designed to move the holder along the slots of the ramps in response to actuation of the bowden wire.

The support and/or the actuator can be made of a suitable metallic sheet material, e.g., by stamping, drawing, embossing or another suitable mass production technique.

It is presently preferred to design the displacing means in such a way that it comprises at least two profiled ramps.

The clutch is or can be of the type wherein the at least one component changes at least one of its first and second positions as a result of wear upon the clutch. The engaging/disengaging apparatus for such clutch can further comprise means for compensating for wear upon the clutch, and such compensating means can be disposed in a power flow between the at least one component and the carrier. For example, the compensating means can be disposed between the carrier and the support. The compensating means can include means for moving the support relative to the carrier. The support can be non-rotatably connected with the carrier for movement in the general direction of the predetermined axis.

The clutch which is to be engaged and disengaged by the improved apparatus can be constructed and assembled in such a way that it comprises a rotary pressure plate movable within limits in the direction of the predetermined axis toward and away from a driven counterpressure plate which shares the rotary movements of the pressure plate about the predetermined axis. When the pressure plate is respectively moved toward and away from the counterpressure plate, it cooperates with the latter to engage and release friction linings on a rotary clutch disc or clutch plate which is interposed between the two plates. The friction linings undergo wear during actual use of the clutch, and this entails a change of the extent of movability of the pressure plate relative to the counterpressure plate. Such clutch further includes means for biasing the pressure plate toward the counterpressure plate and such clutch can further comprise means for changing the position of the biasing means so as to compensate for the change of the extent of movability of the pressure plate relative to the counterpressure plate. The at least one component of the clutch can form part of the aforementioned biasing means, and such biasing means can comprise a diaphragm spring which is tiltably muonted in or on or at a seat provided in a rotary housing of the clutch. The means for changing the position of the biasing means can include means for urging the biasing means against the seat. Such clutch is or can be disengaged as a result of the application of a disengaging force upon the biasing means, and this disengaging force increases or can increase as a result of wear upon the friction linings of the clutch disc or clutch plate. If the at least one component of the clutch forms part of the biasing means, it is or it can be caused to move in the direction of the predetermined axis as a result of wear upon the friction linings of the clutch disc or clutch plate, namely to an extent which is indicative of the extent of wear upon the friction linings.

The counterpressure plate can comprise two coaxial flywheels which are rotatable (e.g., within limits) relative to each other about the predetermined axis, and such counterpressure plate can further comprise one or more dampers having means (e.g., elongated arcuate coil springs or other suitable resilient energy storing elements) for opposing rotation of the flywheels relative to each other. One of the flywheels can be driven by the rotary output element of a prime mover (such as an internal combustion engine), and the other flywheel can constitute the actual counterpressure plate of the clutch.

The novel features which are considered as characteristic of the invention are set forth in particular in the appended claims. The improved clutch engaging and disengaging apparatus itself, however, both as to its construction and its mode of operation, together with additional features and advantages thereof, will be best understood upon perusal of the following detailed description of certain presently preferred specific embodiments with reference to the accompanying drawings.

BRIEF DESCRIPTION OF THE DRAWINGS

FIG. 1a is an axial sectional view of an apparatus which embodies one form of the invention and shows the parts of such apparatus in positions they assume when the clutch is maintained in the engaged condition;

FIG. 1b shows the structure of FIG. 1a but with the parts of the apparatus in positions they assume when the clutch is disengaged;

DESCRIPTION OF PREFERRED EMBODIMENTS

Figure 2:
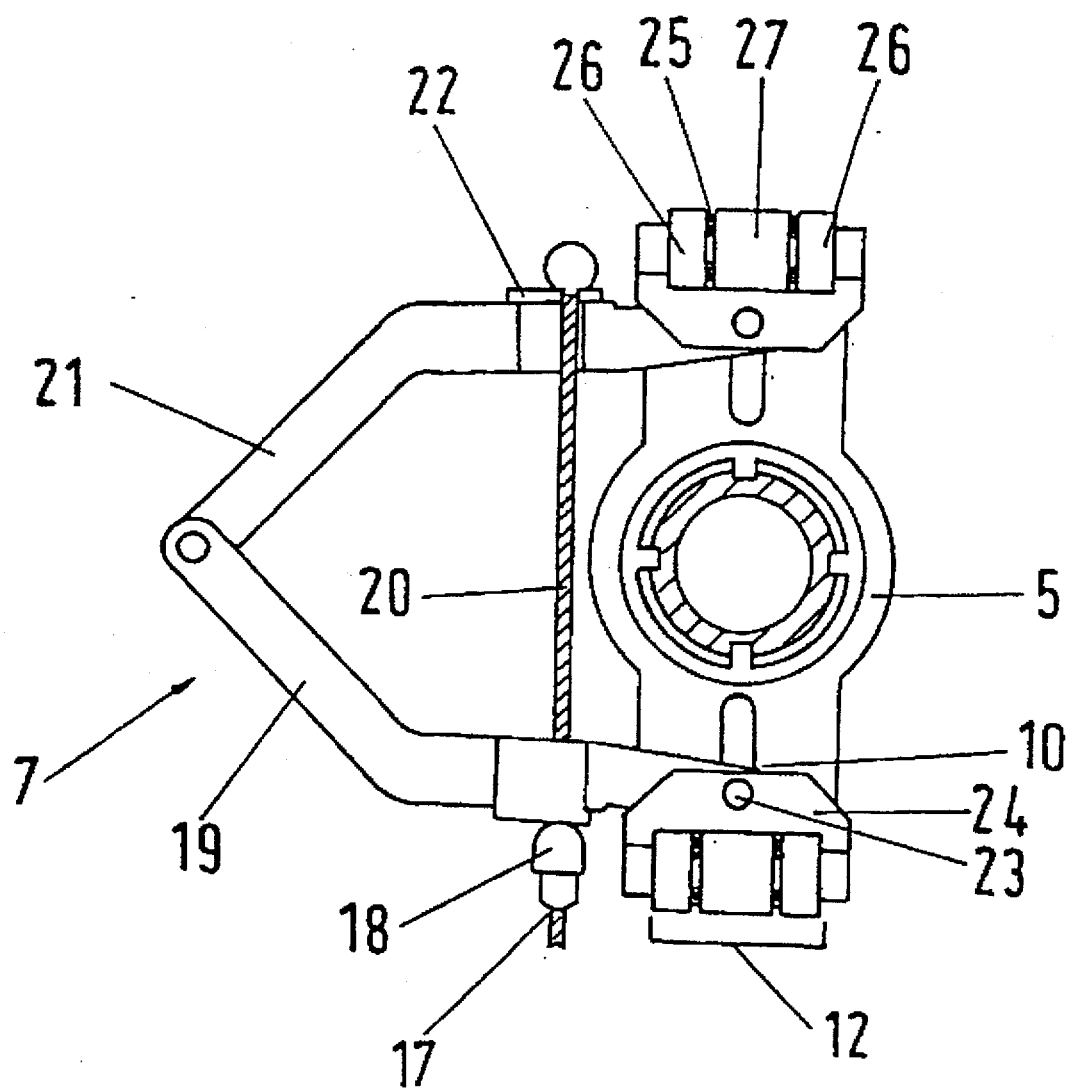
FIG. 2 is a view as seen in the direction of arrow II in FIG. 1a, with certain parts omitted for the sake of clarity.

The clutch engaging and disengaging apparatus 1 which is shown in FIGS. 1a, 1b and 2 is installed between a friction clutch including a clutch spring 16 (such as a diaphragm spring) and a variable-speed transmission including a housing or case 2. The clutch receives torque from an output shaft 32 of a suitable prime mover (such as an internal combustion engine in a motor vehicle) and can transmit torque to the input element 33 (e.g., a shaft) of the variable-speed transmission. The latter is installed in the power train between the clutch disc or clutch plate 34 of the friction clutch and one or more wheels of the motor vehicle. The common axis of the friction clutch including the diaphragm spring 16, of the apparatus 1, and of the transmission including the case or housing spring 2 is shown at X—X. FIG. 1 further shows a cover or housing 35, an axially movable pressure plate 36 and a flywheel or counterpressure plate 37 of the clutch.

The apparatus 1 comprises an axially fixed hollow carrier 3 whose axis coincides with the axis X—X and which is non-rotatably secured to the transmission housing or case 2, e.g., by bolts, screws and/or other suitable fasteners, not shown. The carrier 3 surrounds the rotary input element 33 (e.g., a shaft) of the variable-speed transmission and includes a smaller-diameter tubular sleeve-like portion 4 which is remote from the case 2 and is surrounded by a support 5. The latter serves to take up the forces which must be applied in order to disengage the friction clutch and the forces taken up by the support 5 are transmitted to the carrier 3. The radially inner portion 6 of the support 5 constitutes a relatively short sleeve which is movable along the tubular portion 4 in the directions of the axis X—X.

The tubular portion 4 of the carrier 3 is further surrounded by an actuator 8 which is or which can be a substantial mirror image of the support 5 (with reference to a plane which is normal to the axis X—X) and is movable back and forth along the tubular portion 4 in directions toward and away from the case 2. The radially inner portion of the actuator 8 also constitutes a relatively short sleeve which surrounds the tubular portion 4 and is, in turn, surrounded by a bearing 13. The latter is interposed between the radially inner end portions 16a of radially inwardly extending prongs or tongues forming part of the diaphragm spring 16.

The apparatus 1 further comprises a displacing unit 9 which is designed to displace the actuator 8 from the axial position of FIG. 1a (clutch engaged) to the axial position of FIG. 1b (clutch disengaged). The displacing unit 9 of FIGS. 1a, 1b and 2 comprises a ramp assembly 7 (including ramps 10 on the support 5 and ramps 11 on the actuator 8) and two sets of motion transmitting members 12 movable at least substantially radially of the axis X—X in order to move the actuator 8 axially and away from the support 5 when moving radially inwardly (i.e., from the positions shown in FIG. 1a toward the positions shown in FIG. 1b) in order to disengage the clutch. Such disengagement involves a tilting of the diaphragm spring 16 relative to a housing or cover of the clutch in that the bearing 13 moves the radially inner portions 16a of the prongs or tongues forming part of the spring 16 in a direction to the left, as viewed in FIG. 1a.

The support 5 and the actuator 8 are or can be made of suitably deformed (profiled) metallic sheet material and their respective ramps 10, 11 are inclined relative to each other at a fixed angle. For example, the support 5 and the actuator 8 can constitute stampings.

The bearing 13 is or can be affixed to the actuator 8 so that it is compelled to share all axial movements of the actuator toward and away from the support 5. The arrangement is such that the bearing 13 has limited freedom of radial movement relative to the actuator 8. This is achieved in that one race 14 of the bearing 13 is in frictional force-locking engagement with the adjacent portion of the actuator 8. The latter holds the race 14 against rotation about the axis X—X. A second race 15 of the bearing 13 contacts and is rotatable with the radially inner portions 16a of tongues or prongs of the spring 16. Thus, the race 15 rotates with the spring 16 and the race 14 is non-rotatably coupled to the actuator 8.

As can be seen in FIG. 2, the displacing means 9 for the actuator 8 further comprises a bowden wire 17 which can be operated by a pedal, not shown. The end portion 18 of the casing of the bowden wire is mounted on or merely abuts an arm 19 forming part of a linkage which serves to move the motion transmitting members 12 along the ramps 10 and 11. The free end portion or head of the cable 20 forming part of the bowden wire 17 is anchored (at 22) in an arm 21 forming another part of the aforementioned linkage which can move the motion transmitting members 12 along the ramps 10 and 11.

Each of the arms 19, 21 carries a pivot member 23 which is parallel to the axis X—X and mounts a yoke or housing 24 for one of the two motion transmitting members 12. Each of these members includes three coaxial rolling elements including two relatively short outer rolling elements or cylinders 26 and a relatively long centrally located rolling element or cylinder 27. The rolling elements 26, 27, 26 of each member 12 are mounted on a common shaft 25 which is tangential to the axis X—X. The axial lengths of all four outer rolling elements 26 are or can be the same, and the axial length of one of the centrally located rolling elements 27 does or can match the axial length of the other rolling element 27. The diameters of the rolling elements 26 do or can match the diameters of the rolling elements 27. The yokes or housings 24 are tiltable relative to the respective arms 19, 21 about the axes of the corresponding pivot members 23, and the rolling elements 26, 27, 26 of each member 12 can rotate with and relative to each other about the axis of the respective shaft 25. The arms 19, 21 are articulately connected to each other by a further pivot member whose axis is parallel to the axis X—X.

In order to reduce friction between the rolling elements 26, 27, 26 on each of the shafts 25, such shafts can carry friction reducing rings or analogous devices which are disposed between the axial ends of the rolling elements 27 and the respective outer rolling elements 26. Alternatively, or in addition to such friction reducing parts, the end faces of the rolling elements 26 and/or 27 can be coated with layers of suitable friction reducing material.

FIG. 2 further shows that the support 5 includes two halves which are mirror images of each other with reference to a plane including the axis X—X. The same holds true for the actuator 8. Each of the two halves of the support 5 is provided with a radially extending slot 28, and each of the two halves of the actuator 8 is provided with a radially extending slot 29. The end portions of each pivot member 23 extend into one of the slots 28 and into one of the slots 29. This ensures that the motion transmitting members 12 are compelled to move radially toward the axis X—X in response to actuation of the bowden wire 17 for the purpose of disengaging the friction clutch including the diaphragm spring 16. Owing to such mounting, the pivot members 23 further serve as a means for preventing rotation of the support 5 and actuator 8 relative to each other. Of course, it is equally possible to provide other means (or additional means) for holding the support 5 and the actuator 8 against rotation relative to each other about the axis X—X. The pivot members 23 perform the additional function of ensuring that the two motion transmitting members 12 move radially outwardly and away from the axis X—X during reengagement of the friction clutch, i.e., at a time when the end portions 16a forming part of the prongs on the diaphragm spring 16 are free to move back from the axial positions of FIG. 1b to the axial positions of FIG. 1a.

The race 15 of the bearing 13 can be configurated to conform the shape of its left-hand side (as viewed in FIGS. 1a and 1b) to the shapes of the adjacent portions 16a of prongs forming part of the diaphragm spring 16. As already mentioned above, the race 15 of the bearing 13 shares or can share the angular movements of the diaphragm spring 16 about the axis X—X when the clutch is disengaged so that the clutch disc or clutch plate 34 of the clutch transmits torque to the input shaft 33 of the transmission including the case or housing 2.

If the operator of a vehicle which embodies the structure of FIGS. 1a, 1b and 2 desires to disengage the clutch, she or he depresses the aforementioned pedal which causes the bowden wire 17 to pivot the arms 19, 21 of the linkage forming part of the displacing unit 9 to move the two motion transmitting members 12 of FIG. 2 toward each other, i.e., toward the axis X—X. This is due to the fact that the cable 20 is then retracted deeper into the shell 18 so that the yokes 24 are caused to move toward each other while the end portions of the pivot members 23 slide in the respective pairs of slots 28, 29. It is desirable and presently preferred to ensure that the two motion transmitting members 12 are moved in synchronism with each other, and such synchronization of movements is ensured by the provision of pivot members 23 having end portions which are slidable in the respective slots 28, 29 as well as by the aforedescribed mounting of the arms 19, 21 and bowden wire 17. However, it is clear that additional guide means or special guide means can be provided to further ensure that the motion transmitting members 12 move in synchronism toward as well as preferably away from the axis X—X. As can be seen in FIGS. 1a, 1b and 2, the centrally located rolling elements 27 are caused to roll along the ramps 10 of the two halves of the support 5, and the outer rolling elements 26 are caused to roll along the adjacent ramps 11 of the actuator 8. When the yokes 24 are caused to move toward or away from the axis X—X, the rolling elements 27 and 26 are caused to roll in opposite directions. The actuator 8 and the bearing 13 move axially and away from the support 5 when the members 12 are caused to move toward the axis X—X, i.e., when the aforementioned pedal is actuated in a sense to disengage the friction clutch. When the pressure upon the pedal is relaxed or terminated, the diaphragm spring 16 and/or other biasing means of the friction clutch cause the end portions 16a of the prongs forming part of the spring 16 to return the bearing 13 and the actuator 8 to the axial positions of FIG. 1a, i.e., the clutch is reengaged.

The extent of axial movability of the actuator 8 and/or bearing 13 in a direction to engage or to disengage the friction clutch can be limited by suitable stops, not shown, or in any other suitable way. In other words, it is possible to accurately determine the axial positions of the bearing 13 in the engaged and/or disengaged condition of the clutch.

FIG. 1a further shows a unit 30 which is designed to compensate for wear upon certain components of the friction clutch including the diaphragm spring 16 and/or upon certain component parts of the clutch actuating apparatus 1. The compensating unit 30 is installed in the power train between the carrier 3 (i.e., the part which takes up axial stresses developing during actuation of the clutch) and the rotary race 15 of the bearing 13 at the diaphragm spring 16. The arrangement is preferably such that the unit 30 can compensate for at least some of the wear upon at least some component parts of the friction clutch and/or apparatus 1 in order to ensure that the axial displacement of the actuator 8 (in order to engage or disengage the friction clutch) need not change at all or changes only negligibly during the entire useful life of the power train including the structure shown in FIGS. 1a, 1b and 2. This is desirable and advantageous for proper operation of the clutch, particularly to ensure that the frictional engagement between the pressure plate 36, the counterpressure plate 37 and the friction linings of the clutch disc or clutch plate 34 does not change (or does not change appreciably) as a result of wear upon the pressure plate 36, upon the counterpressure plate 37, upon the diaphragm spring 16 (which biases the pressure plate 36 toward the counterpressure plate 37 when the clutch is engaged) and particularly upon the friction linings of the clutch disc or clutch plate 34. A compensating unit which can be utilized at 30 in or with the apparatus 1 of FIGS. 1a, 1b and 2 is disclosed, for example, in the pending German patent application Serial No. P 43 30 886.4 and in the corresponding U.S. patent application Ser. No. 08/305,519, now U.S. Pat. No. 5,588,517, filed Sep. 13, 1994 by Ad KOOY et al. for "Clutch Operating Apparatus;"the disclosure of this U.S. patent application is incorporated herein by reference.

The bowden wire 17 constitutes but one of numerous available means which can be utilized to shift the motion transmitting members 12 of the displacing unit 9 in the radial direction of the carrier 3. For example, such bowden wire can be replaced with a pneumatically, hydraulically, electrically or otherwise operated motor. The motor can be installed in close or immediate proximity to the constituents 5, 8 and 12 of the displacing unit 9.

The support 5 and/or the actuator 8 can be provided with the aforediscussed straight ramps 10 and/or 11. However, it is equally within the purview of the invention to provide the support 5 and/or the actuator 8 with suitable arched or curved ramps in lieu of the ramps 10 and/or 11; this renders it possible to conform the progress of the force required to move the actuator 8 relative to the support 5 in the direction of the axis X—X to the particular circumstances of use of the clutch.

Still further, it is possible to vary the magnitude of forces which are being applied by the displacing unit 9 as a function of the covered distance. This renders it possible to uniformize or to render more uniform the magnitude of the disengaging force which is to be applied by the bowden wire 17 (or by an equivalent of such wire) for the purpose of and during disengagement of the friction clutch. For example, such result can be achieved by conforming the transmission characteristics of the displacing unit 9 to the progress of forces which must be applied to the end portions 16a of prongs forming part of the diaphragm spring 16 during movement of the end portions 16a in a direction (from the positions of FIG. 1a to the positions of FIG. 1b) to disengage the friction clutch. All that is necessary is to ensure that, as the magnitude of the forces being applied to the end portions 16a during disengagement of the clutch increases, the transmission ratio of the displacing unit 9 also increases, i.e., the magnitude of the force to be applied by the bowden wire 17 or its equivalent can be reduced.

The clutch engaging/disengaging apparatus 1 can be used with particular advantage in conjunction with friction clutches which are provided with automatic means for compensating for wear upon one or more parts during the useful life of the clutch, particularly to compensate for wear at least upon the friction linings of the clutch plate or clutch disc 34 in a friction clutch between the combustion engine and the transmission of a motor vehicle. Still more particularly, the improved apparatus can be utilized with advantage in connection with friction clutches of the type wherein the wear upon the friction linings of the clutch disc or clutch plate 34 entails an axial movement of the diaphragm spring 16 (or its equivalent) and of the end portions 16a of the prongs in the direction of the clutch axis and codirectionally with the pressure plate 36, i.e., toward the counterpressure plate 37 of the clutch. Such axial movability of the diaphragm spring 16 in response to wear upon the friction linings of the clutch plate or clutch disc 34 ensures that the angular position of the diaphragm spring 16 with reference to a plane which is normal to the axis of the friction clutch remains at least substantially unchanged irrespective of the extent of wear upon the friction linings during the useful life of the clutch. Friction clutches of the just outlined character are disclosed, for example, in German patent applications Serial Nos. P 42 39 291.8, P 42 39 289.6, P 42 43 567.6 and P 43 17 586.4 as well as in corresponding patent applications filed in countries other than Federal Republic Germany.

It is further advantageous to employ the clutch engaging/ disengaging apparatus 1 (or its equivalent) in conjunction with a friction clutch wherein the counterpressure plate 37 forms part of or constitutes a simple or a composite flywheel, e.g., a composite flywheel having several coaxial masses which are rotatable relative to each other against the opposition of one or more dampers acting in the circumferential direction of the composite flywheel. A primary mass of the composite flywheel is connected to and receives torque from the rotary output element (see the shaft 32) of a prime mover (such as a combustion engine in a motor vehicle) and a secondary mass of such composite flywheel is adjacent the clutch disc or clutch plate 34 of the friction clutch. Such composite flywheel preferably further comprises at least one antifriction bearing (or another suitable bearing) between the primary and secondary masses. The damper or dampers between the primary and secondary masses can include arcuate coil springs and/or other suitable energy storing elements acting in the circumferential direction of the composite flywheel.

An important advantage of the improved apparatus 1 is that it ensures predictable engagement and disengagement of the associated friction clutch regardless of the extent of wear upon the component parts of the friction clutch itself and/or upon other parts in the entire power train or kinematic train between the output element 32 of the prime mover and the wheel or wheels of a motor vehicle in which the clutch is being put to use. The reason is that the improved apparatus can invariably ensure optimal positioning of the bearing 13 relative to the end portions 16a of the prongs forming part of the diaphragm spring 16 irrespective of the wear upon the friction linings of the clutch disc or clutch plate 34 and (if important) of one or more other parts of the clutch. The absence of accurate or predictable positioning of the end portions 16a in the engaged or disengaged condition of the clutch regardless of the wear upon the friction linings could seriously affect the accuracy of (or would render inoperative) the apparatus which are used in many recently developed friction clutches to compensate for wear upon the friction linings.

Figure 4:
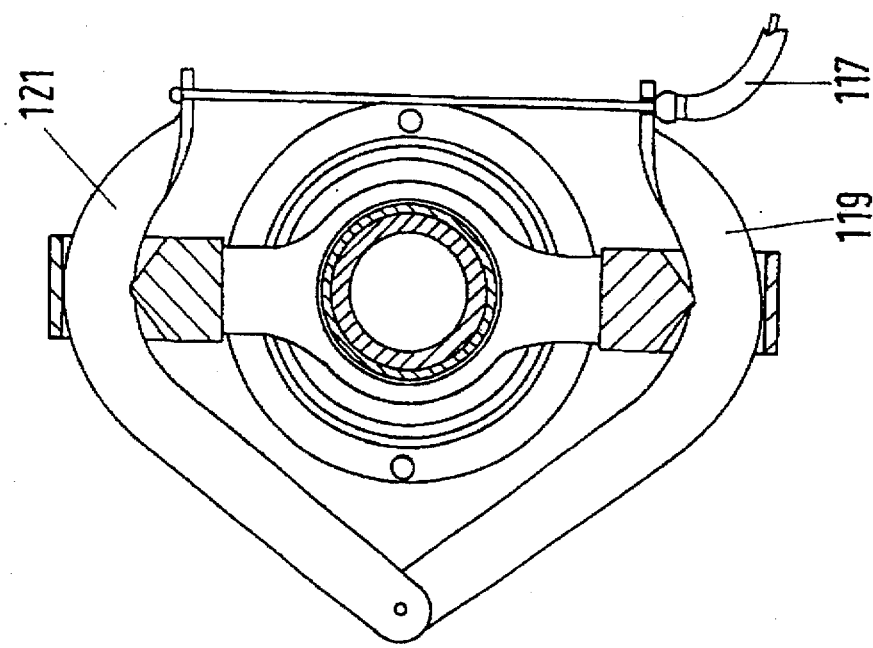
FIG. 4 is a sectional view substantially as seen in the direction of arrows from the line IV—IV in FIG. 3 but with all illustrated parts of the apparatus in positions they assume when the clutch is engaged.
Figure 3:
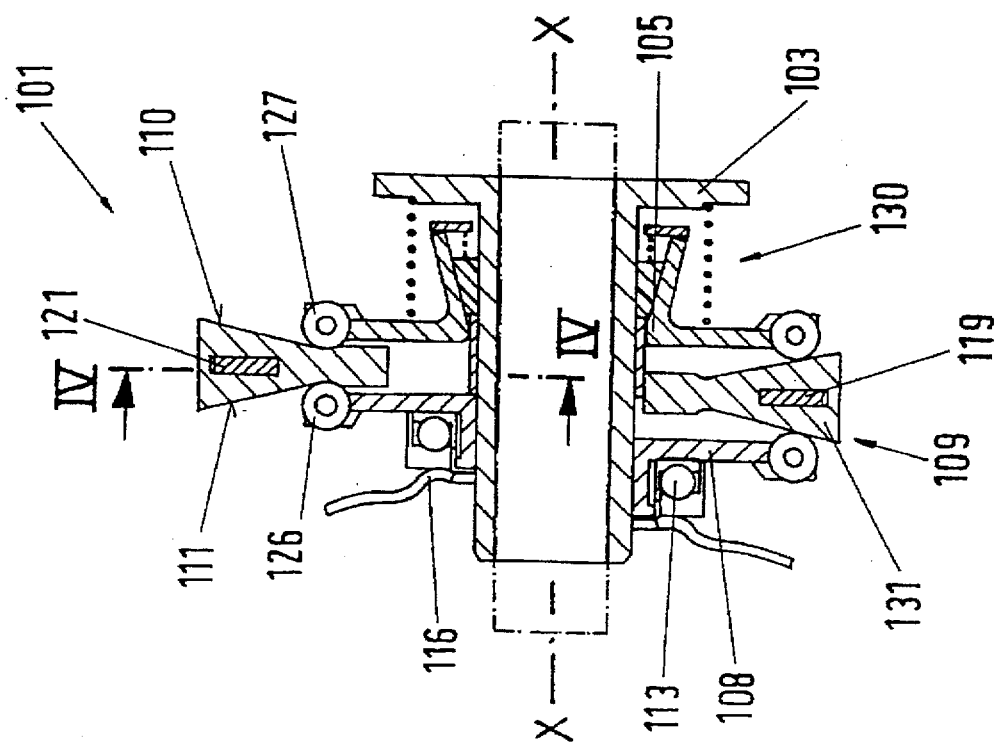
FIG. 3 is an axial sectional view of a modified apparatus, the upper part of the Figure showing the parts of the modified apparatus in positions they assume when the clutch is engaged and the lower part of the Figure showing the parts of such apparatus in positions they assume when the clutch is disengaged.

The aforediscussed advantage is achieved by the simple expedient of the provision of the aforediscussed displacing unit 9 wherein the radially movable motion transmitting members 12 can initiate axial movements of the actuator 8 and bearing 13 in the axial direction of the diaphragm spring 16. In the apparatus 1 of FIGS. 1a, 1b and 2, the radially movable motion transmitting members 12 include the rolling elements 26, 27 which can be caused to roll along the radially fixed ramps 10 and 11. However, and as will be described with reference to FIGS. 3 and 4, it is equally within the purview of the invention to employ radially fixed rolling elements and to provide radially movable motion transmitting members which include or constitute ramps adapted to move relative to the radially fixed rolling elements. Furthermore, whereas the rolling elements 26, 27 of the motion transmitting members 12 shown in FIGS. 1a, 1b and 2 are disposed between the radially fixed ramps, the apparatus which is shown in FIGS. 3 and 4 employs ramps which are disposed between and are movable radially of the radially fixed rolling elements. As utilized herein, the term "between" is intended to denote as seen in the direction of the axis X—X.

The apparatus 1 of FIGS. 1a, 1b and 2 can be modified in a number of additional ways without departing from the spirit of the invention. For example, the number of motion transitting members 12 can be reduced to one or increased to three or more. It is presently preferred to employ two radially movable motion transmitting members 12 which are mirror images of each other with reference to a plane including the axis X—X.

The bowden wire 17 or another mechanical means for moving the motion transmitting members 12 radially of the axis X—X is preferred at this time, particularly over hydraulic motors, because no liquid (such as oil) is likely to penetrate into the clutch space (e.g., as a result of the utilization of defective or damaged sealing elements). Such liquid could affect the reliability of operation of a friction clutch.

The number of rolling elements in each motion transmitting member 12 can be reduced below or increased to more than three. It has been found that the utilization of motion transmitting members 12 each of which comprises three rolling elements 26, 27, 26 having the aforediscussed distribution and dimensions is quite satisfactory to ensure accurate guidance of the actuator 8 and bearing 13 relative to the tubular portion 4 of the carrier 3. The slots 28, 29 for the end portions of the pivot members 23 constitute desirable but optional features of the apparatus 1; all that counts is to ensure predictable guidance of the motion transmitting members 12 radially of the axis X—X and of the actuator 8 and bearing 13 in the direction of such axis. It is immaterial whether such accurate guidance is accomplished with or without the aforedescribed linkage including the arms 19, 21 and/or the equivalents of such means. For example, the slots 28, 29 can be omitted if the displacing unit 9 employs the linkage including the arms 19, 21 or vice versa.

As already mentioned above, the ramps 10 and 11 can define straight or arcuate or even more complex paths for at least substantially radial movements of the motion transmitting or motion converting members 12. If the inclination of the ramps varies, this renders it possible to vary the progress of the disengaging force which is to be applied to the pedal in order to move the end portions 16a of the prongs forming part of the diaphragm spring 16 between the end positions shown in FIGS. 1a and 1b. For example, it is possible to achieve a smoothing of the characteristic curve of the diaphragm spring 16 by way of the pedal.

The support 5 and/or the actuator 8 can be mass produced in the aforedescribed manner, i.e., from blanks made of metallic sheet material in a stamping machine. However, it is equally possible to resort to a drawing or embossing technique.

The compensating unit 30 is preferably installed between the carrier 3 and the support 5 (as seen in the direction of the axis X—X). However, it is also possible to install the unit 30 between the carrier 3 and the case or housing 2 of the transmission.

The support 5 is preferably but need not be movable relative to the carrier 3 in the directions of the common axis X—X of the apparatus 1 and the friction clutch. It is presently preferred to ensure that the support 5 is held against rotation relative to the carrier 3.

The improved apparatus 1 or an equivalent apparatus can be utilized with advantage in conjunction with the aforedescribed friction clutch wherein a pressure plate 36 is non-rotatably but axially movably coupled to the counterpressure plate 37, e.g., by way of the clutch housing 35 which tiltably supports the diaphragm spring 16 of the clutch shown in FIGS. 1 and 1b. The pressure plate 36 can be axially movably coupled to the clutch housing 35, e.g., by leaf springs, and cooperates with the counterpressure plate 37 to clamp the friction linings of the clutch disc or clutch plate 34 when the clutch is engaged, i.e., when the diaphragm spring 16 is maintained in the position of FIG. 1a. The counterpressure plate 37 can include or constitute a flywheel and such clutch can further comprise the aforediscussed means for compensating for wear at lest upon the friction linings during the entire useful life of the clutch. This ensures that the clutch disc 34 is clamped between the pressure plate 36 and the counterpressure plate 37 with an unchanging force even though the thickness of the clutch disc 34 decreases as a result of wear upon its friction linings. The wear compensating means can be designed to shift the diaphragm spring 16 axially toward the counterpressure plate 37 at a rate which is proportional to the extent of wear upon the friction linings of the clutch disc 34. The diaphragm spring 16 can be installed on a seat assembly 38 at the inner side of the clutch housing 35 to act not unlike a two-armed lever which is pivoted relative to the clutch housing 35 in order to engage or disengage the clutch. At least one resilient element (e.g., in the form of a diaphragm spring) is provided to urge the clutch spring (such as the spring 16) against the seat assembly 38 or against that element of the seat assembly which is interposed between the clutch housing 35 and the diaphragm spring, namely that spring which, in the engaged condition of the clutch, urges the pressure plate 36 against the adjacent friction lining of the clutch disc 34. When the wear upon the friction linings increases, the magnitude of the clutch disengaging force rises to such an extent that the bias of the resilient means urging the diaphragm spring 16 against the seat assembly 38 is overcome (such resilient means applies to the diaphragm spring 16 a force which opposes the disengagement of the clutch). Thus, the level of the progress of the clutch disengaging force should rise when the wear upon the friction linings increases so that the diaphragm spring 16 can be lifted off its seat assembly 38 for a short interval of time which suffices to permit an adjustment of the seat assembly 38 relative to the clutch housing 35 in order to reestablish an equilibrium between the forces which urge the diaphragm spring 16 against and away from the seat assembly 38. The just described friction clutch can be designed in such a way that the radially innermost portions of prongs or tongues forming part of the diaphragm spring 16 are caused to move axially and toward the clutch disc 34 during the entire useful life of the clutch at least to an extent which suffices to compensate for wear upon the friction linings of the clutch disc 34.

As also mentioned above, the counterpressure plate 37 of the just described friction clutch can constitute a simple flywheel or a composite flywheel, e.g., a composite flywheel with at least two masses which are rotatable (e.g., within limits) relative to each other against the opposition of one or more suitable dampers. Reference may be had again to the German patent application Serial No. P 43 30 886.4. In addition, reference may be had to the commonly owned United States patent applications Ser. Nos. 07/982,178 of Paul Maucher and 07/982,184 of Wolfgang Reik as well as to the United States patent application Ser. No. 08/171,662 filed Dec. 21, 1993 by Paul Maucher for "Friction Clutch" (corresponding to German patent application Serial No. P 42 43 567.6).

The operation of the clutch engaging and disengaging apparatus 101 of FIGS. 3 and 4 is analogous to that of the apparatus 1. Therefore, all such parts of the apparatus 101 which are identical with or clearly correspond to the aforedescribed parts of the apparatus 1 are denoted by similar reference characters plus 100.

One of the differences between the apparatus 1 and 101 is that motion transmitting members of the apparatus 101 include two ramp holders 131 which are disposed diametrically opposite each other with reference to the axis X—X and each of which includes two ramps 110, 111 which are or which can be mirror images of each other with reference to a plane which is normal to the axis X—X and includes the arms 119, 121 of the linkage receiving motion from the bowden wire 117. The ramp holders 131 are movable radially of the axis X—X and are disposed between pairs of rolling elements 126, 127. The rolling elements 127 are rotatably mounted on the support 105 which, in turn, is mounted on the carrier 103. The rolling elements 126 are mounted on the actuator 108 which is movable along the carrier 103 in the directions of the axis X—X, namely toward or away from the friction clutch which is located to the left of the actuator 108, as viewed in FIG. 3. The support 105 and the actuator 108 cannot rotate on the carrier 103.

When the clutch including the diaphragm spring 116 is to be disengaged (i.e., when the radially inner portions of such spring are to be moved in a direction to the left, as viewed in FIG. 3), the operator of the motor vehicle actuates the pedal (not shown) which causes the bowden wire 117 to pivot the arms 119, 121 in a sense to induce the motion transmitting members or ramp holders 131 to move radially inwardly toward the axis X—X so that the ramps 110, 111 move relative to the respective rolling elements 127, 126 whereby the actuator 108 and the bearing 113 move axially of the carrier 103 and away from the support 105. This causes the diaphragm spring 116 of the friction clutch to pivot relative to the clutch housing (see the housing 35 of FIG. 1a) and to permit the pressure plate of the clutch (see the pressure plate 36 of FIG. 1a) to move axially and away from the counterpressure plate (see the counterpressure plate 37 of FIG. 1a). This entails a termination or an adequate reduction of the clamping action upon the friction linings of the clutch disc (see the clutch disc 34 of FIG. 1a) so that the clutch is disengaged.

When the operator of the vehicle ceases to depress the pedal, the diaphragm spring 116 and/or one or more other springs (not shown) causes or cause the bearing 113 and the actuator 108 to move axially toward the support 105. This, in turn, causes the two ramp holders 131 to move radially outwardly so that the ramps 110, 111 slide along the adjacent rolling elements 127, 126 until the holders 131 reassume the radially outermost positions shown in FIG. 3. In other words, the clutch including the diaphragm spring 116 is reengaged.

The apparatus 101 can also comprise means for limiting the extent of movability of the actuator 108 and the bearing 113 in the directions of the axis X—X. Furthermore, the apparatus 101 also comprises a unit 130 which can compensate for wear upon the parts of the apparatus and/or for wear upon the friction linings forming part of the friction clutch including the diaphragm spring 116. As can be seen in FIG. 3, the compensating unit 130 can comprise one or more coil springs and/or other resilient means for biasing the support 105 in a direction toward the diaphragm spring 116.

The apparatus 1 and/or 101, as well as the combinations of such apparatus with various types of friction clutches are susceptible of numerous additional modifications without departing from the spirit of the invention. Furthermore, certain features of the apparatus 101 can be incorporated into the apparatus 1 and/or vice versa. Still further, the apparatus 1 and/or 101 can be incorporated in or combined with clutches of the type described and/or shown in the aforementioned German and other patent applications. Last but not least, certain individual elements of the apparatus 1 and/or 101 as well as certain combinations of two or more elements forming part of such apparatus are or can be deemed to constitute novel and unobvious features which deserve patent protection per se.

A friction clutch which is not provided with means for compensating for wear upon the friction linings of its clutch disc or clutch plate but which can be engaged and disengaged by resorting to the apparatus of the present invention is disclosed, for example, in commonly owned U.S. Pat. No. 5,160,007 granted Nov. 3, 1992 to Wolfgang Reik et al. for "Apparatus for transmitting torque in power trains of motor vehicles". The disclosure of this patent is incorporated herein by reference.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art and, therefore, such adaptations should and are intended to be comprehended within the meaning and range of equivalence of the appended claims.

What is claimed is:

1. Apparatus for changing the condition of an engageable and disengageable clutch, comprising a carrier non-rotatably connectable with a housing of a transmission; a bearing supported by and movable relative to said carrier longitudinally of a predetermined axis of the apparatus to thereby displace at least one mobile component of the clutch between a first position and a second position; a support provided on and non-rotatable connected with said carrier; a mobile actuator provided on said carrier between said support and said bearing; and means for displacing said actuator relative to said support, including at least one motion transmitting member movable substantially radially of said axis to thereby displace said actuator at least substantially in the direction of said axis.

2. The apparatus of claim 1 for changing the condition of a friction clutch which is interposed between an output element of a prime mover and an input element of said transmission, said carrier being arranged to be positioned adjacent said transmission and said bearing being arranged to move in the direction of said axis between said transmission and said prime mover.

3. The apparatus of claim 1, wherein said displacing means comprises ramps and rolling elements contacting said ramps.

4. The apparatus of claim 3, wherein said ramps include at least one first ramp at said support and at least one second ramp at said actuator, said rolling elements including at least one first rolling element engaging said at least one first ramp and at least one second rolling element engaging said at least one second ramp.

5. The apparatus of claim 3, wherein said ramps are movable substantially radially of said axis.

6. The apparatus of claim 3, wherein said rolling elements are movable substantially radially of said axis.

7. The apparatus of claim 3, wherein said ramps are disposed between said rolling elements as seen in the direction of said axis.

8. The apparatus of claim 3, wherein said rolling elements are disposed between said ramps, as seen in the direction of said axis.

9. The apparatus of claim 3, wherein said ramps include first and second sets of ramps disposed substantially diametrically opposite each other with reference to said axis.

10. The apparatus of claim 3, wherein said rolling elements comprise two sets disposed substantially diametrically opposite to each other with reference to said axis.

11. The apparatus of claim 1, wherein said displacing means further comprises a bowden wire.

12. The apparatus of claim 11, wherein said displacing means further comprises a linkage between said bowden wire and said at least one motion transmitting member.

13. The apparatus of claim 1, wherein said displacing means comprises at least two motion transmitting members and means for moving said at least two motion transmitting members at least substantially simultaneously and at least substantially symmetrically with reference to said axis.

14. The apparatus of claim 1, wherein said displacing means further comprises at least one ramp on each of said support and said actuator, said ramps being spaced apart from each other in the direction of said axis and said at least one motion transmitting member comprising a plurality of rolling elements rotatable about a second axis which is at least substantially tangential to said predetermined axis, said rolling elements including at least one first rolling element in rolling contact with the at least one ramp on said support and at least one second rolling element in rolling contact with the at least one ramp on said actuator.

15. The apparatus of claim 14, wherein said plurality includes three rolling elements two of which are in rolling contact with one of said ramps and the third of which is in rolling contact with the other of said ramps.

16. The apparatus of claim 15, wherein said third rolling element is disposed between said two rolling elements as seen in the direction of said second axis.

17. The apparatus of claim 16, wherein said third rolling element has a greater first length and at least one of said two rolling elements has a lesser second length as seen in the direction of said second axis.

18. The apparatus of claim 1, wherein said displacing means comprises a first part including at least two ramps and a second part including at least one rolling element between said ramps, one of said parts forming part of said at least one motion transmitting member.

19. The apparatus of claim 18, wherein said ramps have mutually inclined surfaces making a fixed angle and being contacted by said at least one rolling element.

20. The apparatus of claim 18, wherein said ramps have mutually inclined surfaces which are contacted by said at least one rolling element and make an angle which varies in the radial direction of said predetermined axis.

21. The apparatus of claim 1, wherein said displacing means further comprises a first ramp on said support and a second ramp provided on said actuator and confronting said first ramp, said actuator being movable in the direction of said axis toward and away from said support and being held against rotation relative to said support about said axis, said at least one motion transmitting member including at least one rolling element between said first and second ramps.

22. The apparatus of claim 1 wherein said displacing means further comprises a first ramp on said support and a second ramp provided on said actuator and confronting said first ramp, said ramps extending substantially radially of said axis and making a fixed angle, each of said ramps having a slot extending substantially radially of said axis and said at least one motion transmitting member including at least one rolling element contacting said ramps and a shaft-like device movable with said at least one rolling element and having portions extending into said slots.

23. The apparatus of claim 22, wherein said displacing means further comprises means for moving said shaft-like device substantially radially of said axis including a holder for said at least one rolling element, said holder being mounted on said shaft-like device and said moving means further comprising a linkage arranged to move said holder along said slots.

24. The apparatus of claim 1, wherein at least one of said support and said actuator is made at least in part of a metallic material.

25. The apparatus of claim 1, wherein displacing means comprises at least two profiled ramps.

26. The apparatus of claim 1 for changing the condition of a clutch wherein said at least one component changes at least one of said positions thereof as a result of wear upon the clutch, further comprising means for compensating for wear upon the clutch and said compensating means being arranged to be disposed in a power flow between said at least one component and said carrier.

27. The apparatus of claim 26, wherein said compensating means is disposed between said carrier and said support.

28. The apparatus of claim 27, wherein said compensating means includes means for moving said support relative to said carrier.

29. The apparatus of claim 27, wherein said support is nonrotatably connected with said carrier for movement in the general direction of said axis.

30. The apparatus of claim 26, wherein said compensating means is arranged to change the condition of a clutch wherein a rotary pressure plate is movable within limits in the direction of said axis toward and away from and shares rotary movements of a driven counterpressure plate to thereby engage and release friction linings on a clutch disc between said plates and the friction linings undergo wear which entails a change of the extent of movability of said pressure plate relative to said counterpressure plate, the clutch further having means for biasing said pressure plate toward said counterpressure plate and means for changing the position of said biasing means so as to compensate for said change of the extent of movability of said pressure plate relative to said counterpressure plate.

31. The apparatus of claim 30 for changing the condition of a clutch wherein said at least one component forms part of said biasing means.

32. The apparatus of claim 30 for changing the condition of a clutch wherein said biasing means comprises a diaphragm spring tiltably mounted in a seat provided in a rotary housing of the clutch, said means for changing the position of said biasing means including means for urging said biasing means against said seat.

33. The apparatus of claim 32 for changing the condition of a clutch which is disengaged as a result of the application of a disengaging force upon said biasing means and said disengaging force increases as a result of wear upon said friction linings.

34. The apparatus of claim 32 for changing the condition of a clutch wherein said at least one component forms part of said biasing means and is caused to move in the direction of said axis as a result of wear upon said friction linings and to an extent which is indicative of the wear upon the friction linings.

35. The apparatus of claim 30 for changing the condition of a clutch wherein the counterpressure plate comprises two coaxial flywheels rotatable with and relative to each other about said axis, and at least one damper having means for opposing rotation of said flywheels relative to each other.

36. Apparatus for changing the condition of an engageable and disengageable clutch, comprising a carrier; a bearing supported by and movable relative to said carrier longitudinally of a predetermined axis of the apparatus to thereby displace at least one mobile component of the clutch between a first position and a second position; a support on said carrier; a mobile actuator provided on said carrier between said support and said bearing; and means for displacing said actuator relative to said support, including at least two motion transmitting members rotatable about second axes at least substantially normal to and spaced apart from said predetermined axis as seen radially of said predetermined axis, said motion transmitting members being movable substantially radially of said predetermined axis to thereby displace said actuator at least substantially in the direction of said axis.

37. Apparatus for changing the condition of an engageable and disengageable friction clutch which is interposed between an output element of a prime mover and an input element of a transmission, comprising a carrier; a bearing supported by and movable relative to said carrier longitudinally of a predetermined axis of the apparatus to thereby displace at least one mobile component of the clutch between a first position and a second position; a support on said carrier; a mobile actuator provided on said carrier between said support and said bearing; and means for displacing said actuator relative to said support, including at least two motion transmitting members movable substantially radially of said axis to thereby displace said actuator at least substantially in the direction of said axis, said carrier being arranged to be positioned adjacent and to be supported by the transmission in the direction of said axis and said bearing being arranged to move in the direction of said axis between the transmission and the prime mover, said motion transmitting members being positioned relative to said axis and relative to each other to generate—in response to a change of the condition of the clutch—forces acting radially of said axis and neutralizing each other.

38. Apparatus for changing the condition of an engageable and disengageable clutch, comprising a carrier; a bearing supported by and movable relative to said carrier longitudinally of a predetermined axis of the apparatus to thereby displace at least one mobile component of the clutch between a first position and a second position; a support on said carrier; a mobile actuator provided on said carrier between said support and said bearing; and means for displacing said actuator relative to said support, including at least two motion transmitting members movable substantially radially of said axis to thereby displace said actuator at least substantially in the direction of said axis, said displacing means further comprising at least one ramp on each of said support and said actuator, said ramps being spaced apart from each other in the direction of said axis and each of said at least two motion transmitting members comprising a plurality of rolling elements rotatable about a discrete second axis which is at least substantially normal to said predetermined axis, said rolling elements including at least one first rolling element in rolling contact only with the at least one ramp on said support and at least one second rolling element in rolling contact only with the at least one ramp on said actuator.

39. Apparatus for changing the condition of an engageable and disengageable clutch, comprising a carrier; a bearing supported by and movable relative to said carrier longitudinally of a predetermined axis of the apparatus to thereby displace at least one mobile component of the clutch between a first position and a second position; a support on said carrier; a mobile actuator provided on said carrier between said support and said bearing; and means for displacing said actuator relative to said support, including at least one motion transmitting member movable substantially radially of said axis to thereby displace said actuator at least substantially in the direction of said axis, said at least one component being arranged to change at least one of said positions thereof as a result of wear upon the clutch; and means for automatically compensating for wear upon the clutch, said compensating means being arranged to be disposed in a power flow between said at least one component of the clutch and said carrier.

* * * * *